US012221011B2

(12) United States Patent
Kim et al.

(10) Patent No.: US 12,221,011 B2
(45) Date of Patent: Feb. 11, 2025

(54) ELECTRIFIED VEHICLE

(71) Applicants: Hyundai Motor Company, Seoul (KR); Kia Corporation, Seoul (KR)

(72) Inventors: Yong Jae Kim, Suwon-Si (KR); Ki Seung Baek, Hwaseong-Si (KR); Jong Gu Lee, Seoul (KR); Gun Goo Lee, Suwon-Si (KR); Jeong Han Park, Anyang-Si (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 155 days.

(21) Appl. No.: 18/195,106

(22) Filed: May 9, 2023

(65) Prior Publication Data

US 2024/0116398 A1   Apr. 11, 2024

(30) Foreign Application Priority Data

Oct. 11, 2022  (KR) .................. 10-2022-0129812

(51) Int. Cl.
| | |
|---|---|
| *H02P 1/00* | (2006.01) |
| *B60L 7/14* | (2006.01) |
| *B60L 15/20* | (2006.01) |
| *B60L 50/60* | (2019.01) |
| *B60L 58/12* | (2019.01) |
| *B60L 58/25* | (2019.01) |
| *H02P 3/00* | (2006.01) |
| *H02P 5/00* | (2016.01) |

(52) U.S. Cl.
CPC ................ *B60L 58/25* (2019.02); *B60L 7/14* (2013.01); *B60L 15/20* (2013.01); *B60L 50/60* (2019.02); *B60L 58/12* (2019.02); *B60L 2210/40* (2013.01); *B60L 2240/423* (2013.01); *B60L 2240/545* (2013.01); *B60L 2240/549* (2013.01)

(58) Field of Classification Search
CPC .......... B60L 58/25; B60L 58/12; B60L 50/60; B60L 7/14
USPC ........................................................ 318/139
See application file for complete search history.

(56) References Cited

U.S. PATENT DOCUMENTS

| | | | | |
|---|---|---|---|---|
| 6,323,729 | B1* | 11/2001 | Sevenhans | H03F 1/0277 330/297 |
| 8,655,533 | B2* | 2/2014 | Takagi | B60K 6/46 180/65.265 |
| 2020/0247252 | A1* | 8/2020 | Dudar | H01M 10/615 |
| 2020/0339081 | A1* | 10/2020 | Suzuki | B60T 8/17 |

* cited by examiner

*Primary Examiner* — Erick D Glass
(74) *Attorney, Agent, or Firm* — BANNER & WITCOFF, LTD.

(57) ABSTRACT

An electrified vehicle includes: a battery; a motor drive device configured to drive a motor through an inverter, based on a voltage of the battery; and a battery controller configured to determine whether to perform output limiting on the battery, based on whether a ratio of regenerative braking is less than or equal to a preset ratio, wherein the ratio of regenerative braking is varied according to an amount of charging of the battery and an amount of discharging of the battery within a preset time interval, and adjust, based on the output limiting being performed on the battery, a derate ratio associated with a battery output limit value.

20 Claims, 6 Drawing Sheets

FIG. 2

| SOC (%) | Battery temperature (°C) | | | | | | | | | |
|---|---|---|---|---|---|---|---|---|---|---|
| | -40 | -20 | 0 | 25 | 35 | 40 | 45 | 50 | 55 | 80 |
| 100 | 60 | 120 | 160 | 200 | 200 | 200 | 160 | 120 | 60 | 0 |
| 90 | 55 | 110 | 150 | 190 | 190 | 190 | 150 | 110 | 55 | 0 |
| 80 | 50 | 100 | 140 | 180 | 180 | 180 | 140 | 100 | 50 | 0 |
| 70 | 45 | 90 | 130 | 170 | 170 | 170 | 130 | 90 | 45 | 0 |
| 60 | 40 | 80 | 120 | 160 | 160 | 160 | 120 | 80 | 40 | 0 |
| 50 | 35 | 70 | 110 | 150 | 150 | 150 | 110 | 70 | 35 | 0 |
| 40 | 30 | 60 | 100 | 140 | 140 | 140 | 100 | 60 | 30 | 0 |
| 30 | 25 | 50 | 90 | 130 | 130 | 130 | 90 | 50 | 25 | 0 |
| 20 | 20 | 40 | 80 | 130 | 120 | 120 | 80 | 40 | 20 | 0 |
| 10 | 15 | 30 | 70 | 110 | 110 | 110 | 70 | 30 | 15 | 0 |
| 0 | 0 | 0 | 0 | 0 | 0 | 0 | 0 | 0 | 0 | 0 |

FIG. 6

| Average output (kW) | Battery temperature (°C) | | | | | |
|---|---|---|---|---|---|---|
| | 35 | 40 | 45 | 50 | 55 | 60 |
| 100 | 30 | 25 | 20 | 15 | 10 | 0 |
| 80 | 40 | 35 | 30 | 25 | 20 | 0 |
| 60 | 50 | 45 | 45 | 40 | 35 | 0 |

ELECTRIFIED VEHICLE

CROSS-REFERENCE TO RELATED APPLICATION(S)

This application is based on and claims priority under U.S.C. 119 to Korean Patent Application No. 10-2022-0129812, filed on Oct. 11, 2022, in the Korean Intellectual Property Office, the disclosure of which is herein incorporated by reference in its entirety.

TECHNICAL FIELD

The present disclosure relates to an electrified vehicle configured to alleviate battery overheating which occurs during high-speed traveling.

BACKGROUND

Recently, there have been increasing demands for electrified vehicles that generate propulsion by driving motors with electric energy stored in batteries, as opposed to internal combustion engine vehicles that generate propulsion by burning fossil fuel, in line with global trends to reduce carbon dioxide emissions.

One of the challenges involved with electrified vehicles is that the higher the traveling speed, the greater the battery output power may be, thereby overheating batteries, and electrified vehicles may be inadvertently powered off while traveling due to battery overheating.

Although many electrified vehicles are equipped with battery cooling systems for alleviating battery overheating, it may be difficult to prevent battery overheating with battery cooling systems alone if the high-speed traveling is sustained for an extended period of time.

The battery output power may be limited to alleviate battery overheating which occurs during high-speed traveling of electrified vehicles, but limiting the battery output power in a high-speed traveling situation may degrade the high-speed traveling performance of vehicles.

SUMMARY

The present disclosure may determine whether or not to limit the battery output power on the basis of the ratio of regenerative braking which varies according to the amount of charging and the amount of discharging of the battery, thereby alleviating battery overheating and improving the high-speed traveling performance of the vehicle.

The technical subjects pursued in the present disclosure may not be limited to the above mentioned technical subjects, and other technical subjects which are not mentioned may be clearly understood, through the following descriptions, by those skilled in the art to which the present disclosure pertains.

In accordance with the present disclosure, an electrified vehicle may include: a battery; a motor drive device configured to drive a motor through an inverter, based on a voltage of the battery; and a battery controller configured to: determine whether to perform output limiting on the battery, based on whether a ratio of regenerative braking is less than or equal to a preset ratio, wherein the ratio of regenerative braking is varied according to an amount of charging of the battery and an amount of discharging of the battery within a preset time interval; and adjust, based on the output limiting being performed on the battery, a derate ratio associated with a battery output limit value.

The ratio of regenerative braking may be varied according to a ratio of the amount of charging of the battery to the amount of discharging of the battery.

The ratio of regenerative braking may be calculated based on a ratio of values, of a current of the battery, accumulated during the preset time interval to absolute values, of the current of the battery, accumulated during the preset time interval.

Based on a battery output map, the derate ratio may correspond to a ratio of the battery output limit value to a maximum battery output setting value.

The battery controller may be configured to determine whether to perform the output limiting, further based on: whether an average battery output power is greater than or equal to a preset power, and whether a battery temperature is greater than or equal to an output limit initiation temperature.

The average battery output power may be negatively correlated with the output limit initiation temperature set by the battery controller.

The battery controller may be further configured to determine the battery output limit value by: determining a maximum battery output setting value based on a battery output map; and multiplying the maximum battery output setting value by the derate ratio.

The battery controller may be configured to determine the maximum battery output setting value by accessing, based on a state of charge of the battery and a battery temperature, the battery output map.

The derate ratio may be negatively correlated with an average battery output power.

The battery controller may be further configured to set the derate ratio to 1 based on the output limiting being not performed.

The battery controller may include a rate limiter configured to: change the battery output limit value within a preset change rate limit; and output the changed battery output limit value to an external device.

The battery controller may be further configured to, based on the output limiting being performed, set a largest value, among a current battery output power, an average battery output power, and the battery output limit value, as an initial value of the changed battery output limit value.

The battery controller may be further configured to, based on the output limiting being not performed, set a maximum battery output setting value as an initial value of the changed battery output limit value.

The electrified vehicle of claim 1 may further include: a motor controller configured to output a motor output limit value and an inverter output limit value; and a vehicle controller configured to transmit a torque command, associated with the motor, to the motor controller. The torque command may be based on a smallest value among the battery output limit value, the motor output limit value, and the inverter output limit value.

According to the present disclosure, an electrified vehicle may include: a battery; a motor drive device configured to drive a motor through an inverter, based on a voltage of the battery; and a battery controller configured to: determine whether to perform output limiting on the battery, based on whether a ratio of regenerative braking is less than or equal to a preset ratio, wherein the ratio of regenerative braking is varied according to an amount of charging of the battery and an amount of discharging of the battery within a preset time interval; and determine, based on the output limiting being performed on the battery and based on a battery output limit map, a battery output limit value.

The ratio of regenerative braking may be varied according to a ratio of the amount of charging of the battery to the amount of discharging of the battery.

The battery controller may be configured to determine whether to perform the output limiting, further based on whether an average battery output power is greater than or equal to a preset power, and whether a battery temperature is greater than or equal to an output limit initiation temperature.

The battery controller may be configured to determine the battery output limit value by determining a maximum output setting value based on the battery output limit map, and wherein the battery output limit map comprises information regarding maximum battery output setting values corresponding to respective combinations of average battery output powers and battery temperatures.

The battery controller may be configured to, based on the output limiting being not performed, determine the battery output limit value by determining, based on the battery output limit map, a maximum output setting value, and wherein the battery output limit map comprises information regarding maximum battery output setting values corresponding to respective combinations of state of charge values of the battery and battery temperatures.

The electrified vehicle may further include: a motor controller configured to output a motor output limit value and an inverter output limit value; and a vehicle controller configured to transmit a torque command, associated with the motor, to the motor controller, wherein the torque command is based on a smallest value among the battery output limit value, the motor output limit value, and the inverter output limit value.

According to the present disclosure, it may be determined whether or not to limit the battery output power on the basis of the ratio of regenerative braking which varies according to the amount of charging and the amount of discharging of the battery, thereby alleviating battery overheating and improving the high-speed traveling performance of the vehicle.

Advantageous effects obtainable from the present disclosure may not be limited to the above mentioned effects, and other effects which are not mentioned may be clearly understood, through the following descriptions, by those skilled in the art to which the present disclosure pertains.

BRIEF DESCRIPTION OF THE DRAWINGS

The accompanying drawings illustrate exemplary embodiments of the present disclosure to facilitate understanding of the technical idea of the present idea together with the following detailed description of the present disclosure, which is not to be interpreted as being limited to details in the drawings:

FIG. 2 illustrates an example of a battery output map;

FIG. 6 illustrates an example of a battery output limit map.

DETAILED DESCRIPTION

Figure 1:
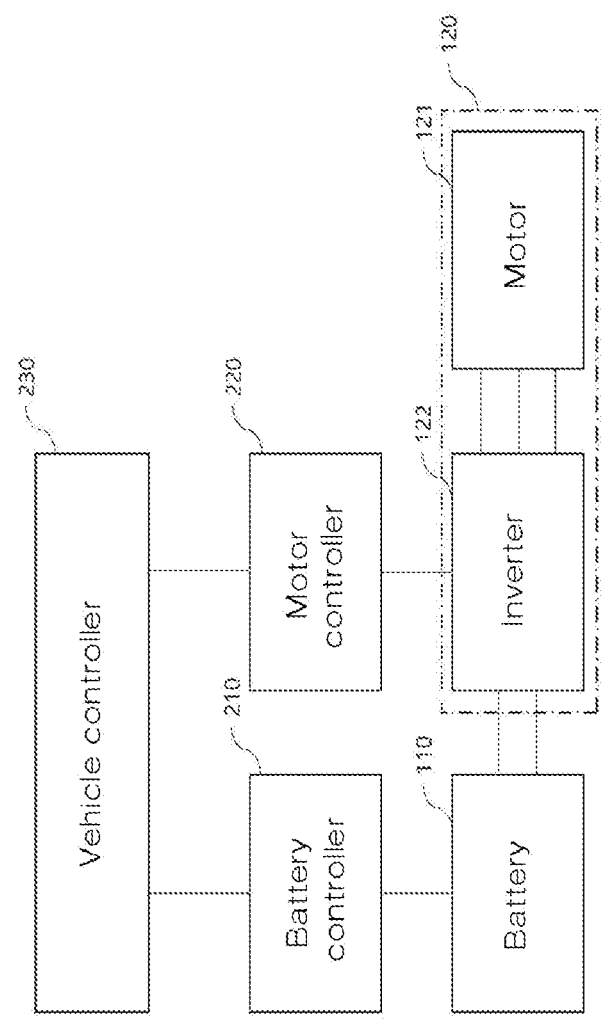
FIG. 1 is a block diagram illustrating the control system of an electrified vehicle.

Hereinafter, embodiments disclosed in the present specification will be described in detail with reference to the accompanying drawings, and the same or similar elements are given the same and similar reference numerals, so duplicate descriptions thereof will be omitted.

As used in the following description of embodiments, the term "predetermined" means that, when a parameter is used in a process or algorithm, the value of the parameter has previously been determined. According to embodiments, the value of the parameter may be set at the beginning of the process or algorithm or may be set during a period when the process or algorithm is performed.

The terms "module" and "unit" used for the elements in the following description are given or interchangeably used in consideration of only the ease of writing the specification, and do not have distinct meanings or roles by themselves.

In describing the embodiments disclosed in the present specification, when the detailed description of the relevant known technology is determined to unnecessarily obscure the gist of the present disclosure, the detailed description may be omitted. Further, the accompanying drawings are provided only for easy understanding of the embodiments disclosed in the present specification, and the technical spirit disclosed herein is not limited to the accompanying drawings, and it should be understood that all changes, equivalents, or substitutes thereof are included in the spirit and scope of the present disclosure.

Terms including an ordinal number such as "first", "second", or the like may be used to describe various elements, but the elements are not limited to the terms. The above terms are used only for the purpose of distinguishing one element from another element.

In the case where an element is referred to as being "connected" or "coupled" to any other element, it should be understood that another element may be provided therebetween, as well as that the element may be directly connected or coupled to the other element. In contrast, in the case where an element is "directly connected" or "directly coupled" to any other element, it should be understood that no other element is present therebetween.

A singular expression may include a plural expression unless they are definitely different in a context.

As used herein, the expression "include" or "have" are intended to specify the existence of mentioned features, numbers, steps, operations, elements, components, or combinations thereof, and should be construed as not precluding the possible existence or addition of one or more other features, numbers, steps, operations, elements, components, or combinations thereof.

A unit or a control unit included in names such as a hybrid control unit (HCU) and a vehicle control unit (VCU) is merely a term widely used for naming a controller configured to control a specific function of a vehicle, but does not mean a generic function unit. For example, each controller may include a communication device configured to communicate with a sensor or another control unit, a memory configured to store an operation system, a logic command, or input/output information, and at least one processor configured to perform determination, calculation, decision or the like which are required for responsible function controlling.

FIG. 1 is a block diagram illustrating the control system of an electrified vehicle.

Referring to FIG. 1, the electrified vehicle may include a battery 110, a motor drive device 120 including a motor 121 and an inverter 122, a battery control unit 210, a motor control unit 220, and a vehicle control unit 230.

The battery control unit 210 may be implemented as a battery management system (BMS) for measuring the voltage, current, temperature, and the like of the battery 110 and performing charging/discharging control of the battery 110. The battery control unit 210 may transmit an output limit value regarding the battery 110 to the vehicle control unit 230 on the basis of the measured voltage, current, and temperature of the battery 110.

The motor control unit (MCU) 220 may control a gate drive unit (not illustrated) through a control signal of a pulse width modulation (PWM) type on the basis of the motor angle, phase voltage, phase current, required torque, and the like of the motor 121. The gate drive unit may control the inverter 122 that drives the motor 121. The motor control unit 220 may transmit an output limit value regarding the motor 121 and an output limit value regarding the inverter 122 to the vehicle control unit 230 according to the drive state of the motor 121 and the inverter 122.

The vehicle control unit (VCU) 230 is a superior controller of the battery control unit 210, the motor control unit 220, and the like, and may transmit a torque command regarding the motor 121 to the motor control unit 220 on the basis of the smallest value among the output limit value regarding the battery 110, the output limit value regarding the motor 121, and the output limit value regarding the inverter 122. The motor control unit 220 may control the motor drive device 120 so as to drive the motor 121 through the inverter 122 according to the voltage of the battery 110 on the basis of the torque command.

The battery control unit 210 may determine the maximum output setting value of the battery 110 on the basis of a battery output map and may set the output limit value regarding the battery 110 on the basis of the maximum output setting value. This will be described in detail with reference to FIG. 2.

FIG. 2 illustrates an example of the battery output map.

Referring to FIG. 2, the battery output map may include information regarding maximum battery output setting values corresponding to respective combinations of the state of charge (SOC) of the battery and the temperature of the battery. In the battery output map, the lower the battery SOC, the smaller the maximum battery output setting value may be. If the battery temperature is lower than 25° C. or higher than 40° C., the maximum output setting value may be small (e.g., the maximum output setting value may be smaller as the temperature gets further away from 25° C. or 40° C.)

The battery control unit 210 may refer to the battery output map and may determine the maximum battery output setting value according to a combination of the battery SOC and the battery temperature. For example, if the battery SOC corresponds to 40%, and if the battery temperature corresponds to 50° C., the battery control unit 210 may refer to the battery output map and may determine that the maximum battery output setting value of 60 (kW).

The higher the traveling speed of the electrified vehicle, the larger the battery output power may be, thereby overheating the battery. The battery control unit 210 may thus set a battery output limit value lower than the maximum output setting value based on the battery output map such that battery overheating is alleviated even if the high-speed traveling time is sustained for a long time.

Considering that limiting the battery output power in a high-speed traveling situation degrades the high-speed traveling performance of the vehicle, the battery control unit 210 may limit the battery output power on the basis of whether a specific condition is satisfied.

The battery temperature rise may decrease in proportion to an increase in the ratio of the amount of battery charging against the amount of battery discharging if the amount of regenerative braking is high within a preset time interval. Accordingly, the present disclosure proposes an electrified vehicle configured to determine whether or not to limit the battery output power on the basis of whether the ratio of regenerative braking is less than or equal to a preset ratio, thereby alleviating battery overheating and improving the high-speed traveling performance of the vehicle.

In addition, the electrified vehicle may determine whether or not to limit the battery output power by considering not only the ratio of regenerative braking, but also the battery average output power and the battery temperature. A method for operating the electrified vehicle will now be described.

Figure 3:
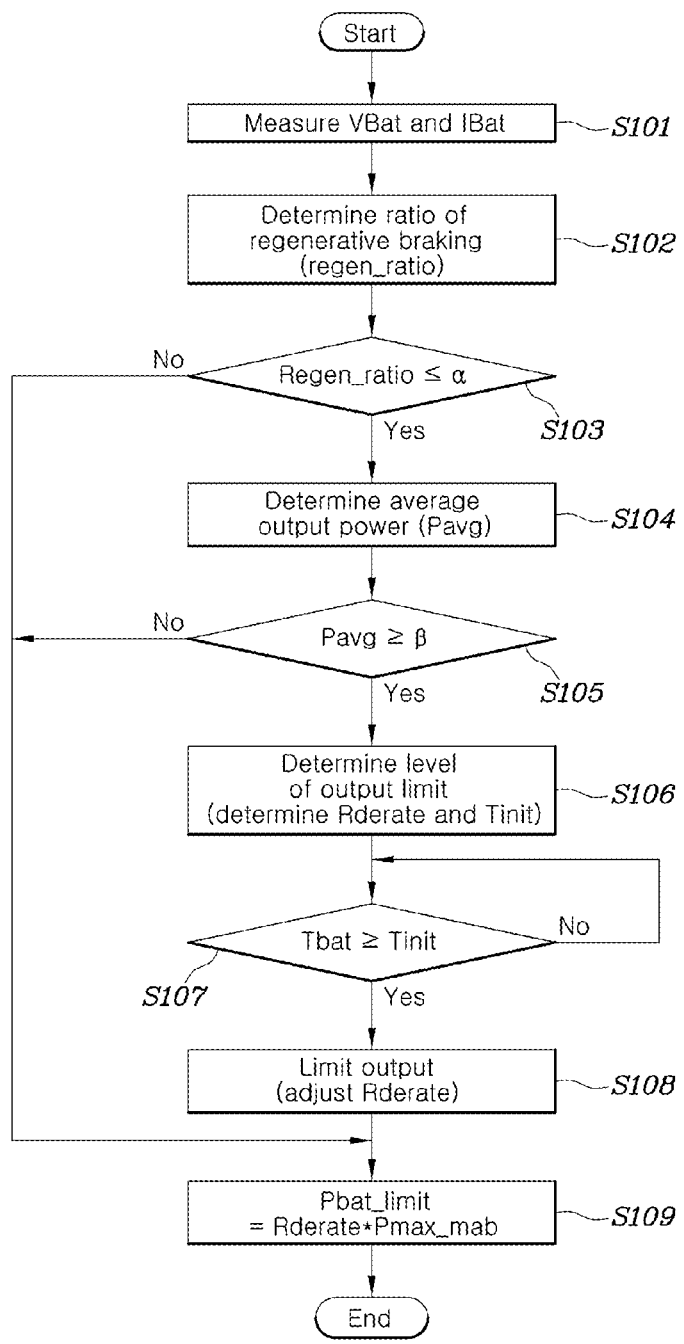
FIG. 3 is a flowchart illustrating a method for controlling electrified vehicle.

FIG. 3 is a flowchart illustrating a method for controlling electrified vehicle.

Referring to FIG. 3, the battery control unit 210 may measure the voltage VBat and current IBat of the battery (S101).

The battery control unit 210 may determine, on the basis of the voltage VBat and current IBat of the battery measured in S101, the ratio of regenerative braking (regen_ratio) which is varied according to the amount of charging and the amount of discharging of the battery within a preset time interval (S102).

The ratio of regenerative braking (regen_ratio) may be varied according to the ratio of the amount of charging of the battery against the amount of discharging of the battery within a preset time interval. More particularly, the ratio of regenerative braking (regen_ratio) may increase in proportion to the ratio of the amount of charging of the battery against the amount of discharging of the battery. The amount of charging of the battery may correspond to the accumulated amount of electric power stored in the battery during a preset time period (for example, five minutes), and the amount of discharging of the battery may correspond to the accumulated amount of electric power discharged from the battery during a preset time period (for example, five minutes).

More particularly, the battery control unit 210 may calculate the ratio of regenerative braking (regen_ratio) on the basis of the ratio of values, of the battery output power, accumulated during a preset time period (sum(Power)) against the absolute values, of the battery output power, accumulated during the preset time period (sum(abs (Power)), as represented as Equation 1 below:

$$\text{Regen\_ratio} = 1 - \text{abs}\left[\frac{\text{sum(Power)}}{\text{sum(abs(Power))}}\right] \quad \text{[Equation 1]}$$

The battery control unit 210 may calculate the ratio of regenerative braking (regen_ratio) on the basis of the ratio of values, of the battery current, accumulated during a preset time period (sum(I)) against the absolute values, of the battery current, accumulated during the preset time period (sum(abs(I)), as represented as Equation 2 below:

$$\text{Regen\_ratio} = 1 - \text{abs}\left[\frac{\text{sum}(I)}{\text{sum(abs}(I))}\right] \quad \text{[Equation 2]}$$

Thereafter, the battery control unit 210 may determine whether the ratio of regenerative braking is less than or equal to a preset ratio ($\alpha$) in order to determine whether or not to limit the battery output (S103). The preset ratio may be variously set. For example, the preset ratio (a) may be 0.05.

If the ratio of regenerative braking exceeds the preset ratio (α) (NO in S103), the battery control unit 210 may determine not to limit the output. When the output is not limited, the battery control unit 210 may determine that the maximum output setting value (Pmax_mab) based on the battery output map is the battery output limit value (Pbat_limit) (S109). The derate ratio (Rderate) illustrated in S109 may correspond to the ratio of the battery output limit value (Pbat_limit) against the maximum battery output setting value (Pmax_mab) based on the battery output map. When the output is not limited, the battery control unit 210 may determine that the derate ratio (Rderate) is "1".

If the ratio of regenerative braking is less than or equal to the preset ratio (α) (YES IN S103), the battery control unit 210 may multiply the battery voltage (VBat) by the battery current (IBat) measured in S101, thereby obtaining the battery output power, and may determine that the average absolute value of battery output power accumulated during a preset time interval (for example, five minutes) is the average battery output power (Pavg) (S104).

Thereafter, the battery control unit 210 may determine whether the average battery output power (Pavg) is greater than or equal to preset power (β) in order to determine whether or not to limit the output (S105). The preset power (β) may be variously set. For example, the preset power (β) may be 60 (kW).

If the average battery output power (Pavg) is less than the preset power (β) (NO in S105), the battery control unit 210 may determine not to limit the output.

If the average battery output power (Pavg) is greater than or equal to the preset power (β) (YES in S105), the battery control unit 210 may determine the level of output limit according to the average battery output power (Pavg), and may determine the derate ratio (Rderate) and the output limit initiation temperature (Tinit) according to the level of output limit (S106).

More particularly, if the average battery output power (Pavg) is included in a first setting range (for example, 60-80 (kW)), the battery control unit 210 may determine that the level of output limit is a first level, and may thereby determine a derate ratio (Rderate) and an output limit initiation temperature (Tinit) corresponding to the first level.

Likewise, if the average battery output power (Pavg) is included in a second setting range (for example, 80-100 (kW)) higher than the first setting range, the battery control unit 210 may determine that the level of output limit is a second level, and may thereby determine a derate ratio (Rderate) and an output limit initiation temperature (Tinit) corresponding to the second level.

The higher the level of output limit (that is, the higher the range associated with the average battery output power (Pavg)), the lower the derate ratio (Rderate) and the output limit initiation temperature (Tinit) may be. In other words, the derate ratio and the output limit initiation temperature are negatively (or inversely) correlated with the level of the output limit and the average battery output power. For example, the derate ratio (Rderate) may be 0.6 in the case of the first level of output limit and may be 0.5 in the case of the second level of output limit. The output limit initiation temperature (Tinit) may be 45° C. in the case of the first level of output limit and may be 40° C. in the case of the second level of output limit.

Thereafter, the battery control unit 210 may determine whether the battery temperature (Tbat) is greater than or equal to the output limit initiation temperature (Tinit) in order to determine whether or not to limit the output (S107).

If the battery temperature (Tbat) is greater than or equal to the output limit initiation temperature (Tinit) (YES in S107), the battery control unit 210 may determine to limit the output (S108). When limiting the output, the battery control unit 210 may adjust the derate ratio (Rderate) regarding the battery output limit value (Pbat_limit) to the derate ratio (Rderate) determine in S106.

Thereafter, the battery control unit 210 may multiply the maximum battery output setting value (Pmax_mab) based on the battery output map by the derate ratio (Rderate), thereby outputting the battery output limit value (Pbat_limit) (S109).

Figure 4:
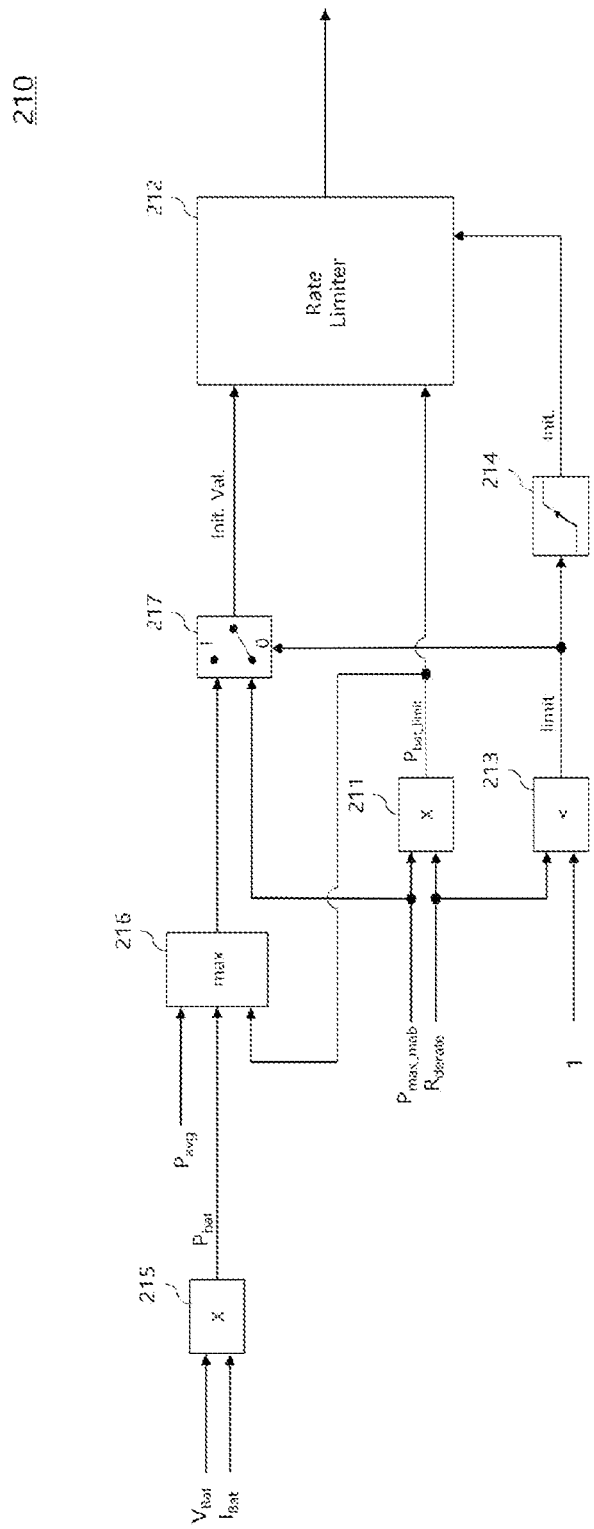
FIG. 4 illustrates the configuration of a battery control unit for performing the control method in FIG. 3.

FIG. 4 illustrates the configuration of a battery control unit for performing the control method in FIG. 3.

Referring to FIG. 4, the battery control unit 210 may include a multiplier 211, a rate limiter 212, a comparator 213, an edge detector 214, a multiplier 215, a maximum value determiner 216, and an initial value selector 217.

The multiplier 211 may multiply a maximum battery output setting value (Pmax_mab) based on a battery output map by a derate ratio (Rderate) and may output the resulting value as a battery output limit value (Pbat_limit). As described above, the derate ratio (Rderate) may be "1" when the output is not limited and may be a value smaller than "1" when the output is limited.

The rate limiter 212 may change the battery output limit value (Pbat_limit) within a preset change rate limit in order to prevent an abrupt fluctuation in battery output, and may output the changed output limit value to the vehicle control unit 230 in FIG. 1.

In addition, the rate limiter 212 may reset the initial value (Init. Val.) regarding the changed output limit value on the basis of an initial value change signal (Init.) activated when the output is limited, in order to alleviate the fluctuation in the current battery output as the output is limited.

The comparator 213 and the edge detector 214 may determine whether or not to activate the initial value change signal (Init.). More particularly, the comparator 213 may activate the output limit signal (limit) if the derate ratio (Rderate) is smaller than "1", that is, if the output is limited. The edge detector 214 may activate the initial value change signal (Init) if the output limit signal (limit) is activated from a logic low level to a logic high level.

The initial value (Init. Val.) may be set by the multiplier 215, the maximum value determiner 216, and the initial value selector 217. More particularly, the multiplier 215 may multiply the current battery voltage (Vbat) and the current battery current (Ibat) and may output the resulting value as the current battery output power (Pbat). The maximum value determiner 216 may output the largest value among the current battery output power (Pbat), the average battery output power (Pavg), and the battery output limit value (Pbat_limit). The initial value selector 217 may set the maximum output setting value (Pmax_mab) as the initial value (Init. Val.) if the output is not limited, on the basis of the output limit signal (limit), and may set the maximum value output by the maximum value determiner 216 as the initial value (Init. Val.) if the output is limited.

A scheme for adjusting the derate ratio (Rderate) regarding the battery output limit value when the battery control unit 210 limits the output has been described above, but the battery control unit 210 may set the battery output limit value with reference to the battery output limit map when limiting the output. This will be described in detail with reference to FIG. 5.

Figure 5:
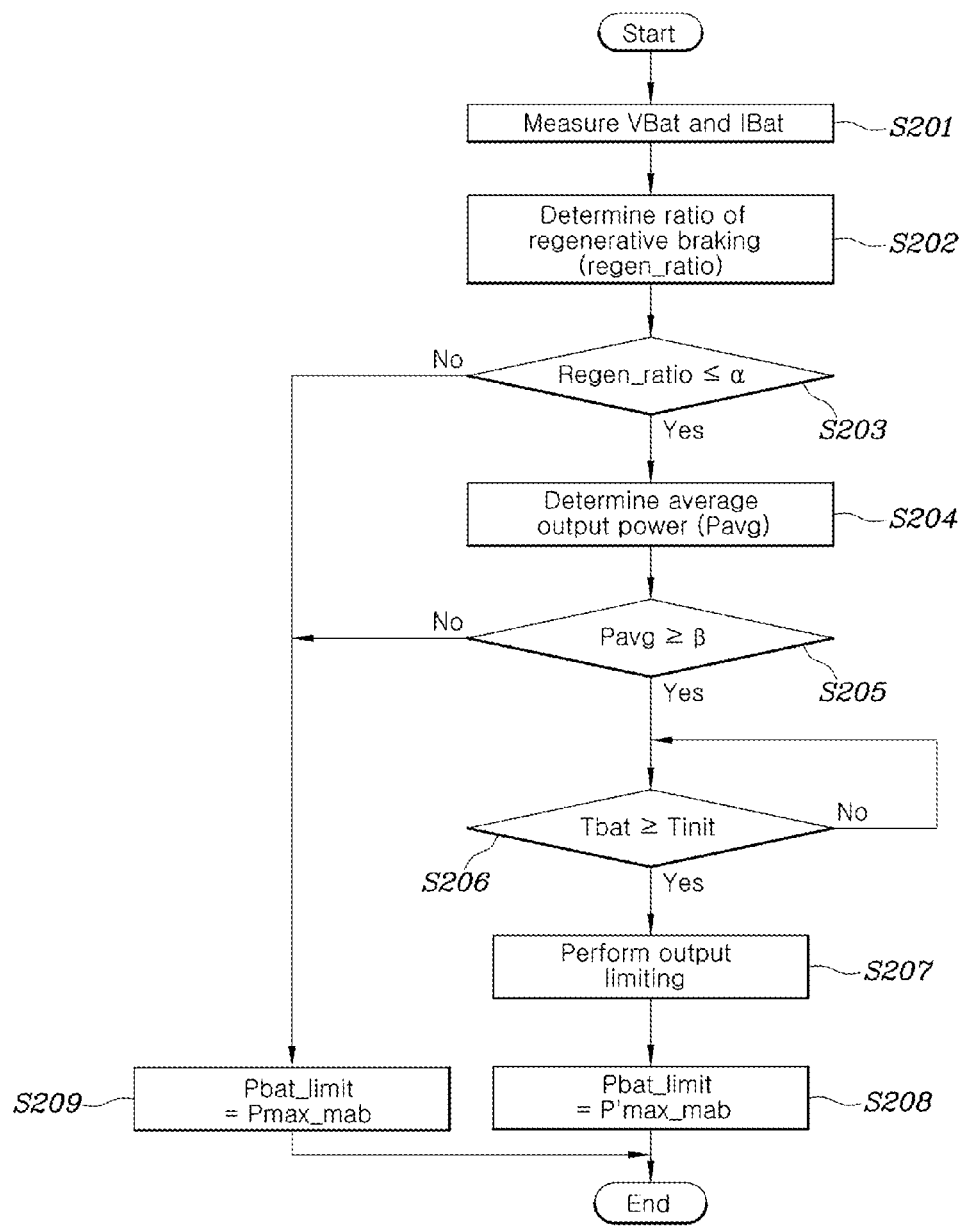
FIG. 5 is a flowchart illustrating a method for controlling an electrified vehicle.

FIG. 5 is a flowchart illustrating a method for controlling an electrified vehicle.

Referring to FIG. 5, the battery control unit 210 may measure the voltage VBat and current IBat of the battery (S201).

The battery control unit 210 may determine, on the basis of the voltage VBat and current IBat of the battery measured in S201, the ratio of regenerative braking (regen_ratio) which is varied according to the amount of charging and the amount of discharging of the battery within a preset time interval (S202). The operating method in S202 may be implemented identically to the operating method in S102 illustrated in FIG. 3.

The battery control unit 210 may determine whether the ratio of regenerative braking (regen_ratio) is less than or equal to a preset ratio ($\alpha$) in order to determine whether or not to limit the output (S203).

If the ratio of regenerative braking exceeds the preset ratio ($\alpha$) (NO in S203), the battery control unit 210 may determine not to limit the output. When the output is not limited, the battery control unit 210 may determine that the maximum output setting value (Pmax_mab) based on the battery output map is the battery output limit value (Pbat_limit) (S209).

If the ratio of regenerative braking is less than or equal to the preset ratio ($\alpha$) (YES in S203), the battery control unit 210 may determine the average battery output power (Pavg) (S204). The operating method in S204 may be implemented identically to the operating method in S104 illustrated in FIG. 3.

Thereafter, the battery control unit 210 may determine whether the average battery output power (Pavg) is greater than or equal to preset power ($\beta$) in order to determine whether or not to limit the output (S205).

If the average battery output power (Pavg) is less than the preset power ($\beta$) (NO in S205), the battery control unit 210 may determine not to limit the output.

If the average battery output power (Pavg) is greater than or equal to the preset power ($\beta$) (YES in S205), the battery control unit 210 may determine whether or not the battery temperature (Tbat) is greater than or equal to the output limit initiation temperature (Tinit) in order to determine whether or not to limit the output (S206). The output limit initiation temperature (Tinit) may have a fixed value.

If the battery temperature (Tbat) is greater than or equal to the output limit initiation temperature (Tinit) (YES in S206), the battery control unit 210 may determine to limit the output (S207).

Thereafter, the battery control unit 210 may determine that the maximum output setting value (P'max_mab) based on the battery output map is the battery output limit value (Pbat_limit) (S208).

An operating method in which the battery control unit 210 determines the maximum battery output setting value (P'max_mab) with reference to the battery output limit map will be described with reference to FIG. 6.

FIG. 6 illustrates an example of the battery output limit map.

Referring to FIG. 6, the battery output limit map may include information regarding maximum battery output setting values corresponding to respective combinations of the average battery output power and the battery temperature.

When the output is limited, the battery control unit 210 may refer to the battery output limit map and may determine the maximum battery output setting value according to a combination of the average battery output power and the battery temperature. For example, when the output is limited, when the average battery output power is 80 (kW), and when the battery temperature is 50° C., the battery control unit 210 may refer to the battery output limit map, may determine that the maximum battery output setting value is 25 (kW), and may set the same as the battery output limit value.

The present disclosure as described above may be implemented as codes in a computer-readable medium in which a program is recorded. The computer-readable medium includes all types of recording devices in which data readable by a computer system are stored. Examples of the computer-readable medium include a hard disk drive (HDD), a solid state disk (SSD), a silicon disk drive (SDD), a read-only memory (ROM), a random access memory (RAM), a compact disc read-only memory (CD-ROM), a magnetic tape, a floppy disk, an optical data storage device, and the like. Further, the above detailed description should not be construed in a limitative sense, but should be considered in an illustrative sense in all aspects. The scope of the present disclosure should be determined by reasonable interpretation of the appended claims, and all changes and modifications within the equivalent scope of the present disclosure fall within the scope of the present disclosure.

What is claimed is:

1. An electrified vehicle comprising:
   a battery;
   a motor drive device configured to drive a motor through an inverter, based on a voltage of the battery; and
   a battery controller configured to:
      determine whether to perform output limiting on the battery, based on whether a ratio of regenerative braking is less than or equal to a preset ratio, wherein the ratio of regenerative braking is varied according to an amount of charging of the battery and an amount of discharging of the battery within a preset time interval; and
      adjust, based on the output limiting being performed on the battery, a derate ratio associated with a battery output limit value.

2. The electrified vehicle of claim 1, wherein the ratio of regenerative braking is varied according to a ratio of the amount of charging of the battery to the amount of discharging of the battery.

3. The electrified vehicle of claim 1, wherein the ratio of regenerative braking is calculated based on a ratio of values, of a current of the battery, accumulated during the preset time interval to absolute values, of the current of the battery, accumulated during the preset time interval.

4. The electrified vehicle of claim 1, wherein, based on a battery output map, the derate ratio corresponds to a ratio of the battery output limit value to a maximum battery output setting value.

5. The electrified vehicle of claim 1, wherein the battery controller is configured to determine whether to perform the output limiting, further based on:
   whether an average battery output power is greater than or equal to a preset power, and
   whether a battery temperature is greater than or equal to an output limit initiation temperature.

6. The electrified vehicle of claim 5, wherein the average battery output power is negatively correlated with the output limit initiation temperature set by the battery controller.

7. The electrified vehicle of claim 1, wherein the battery controller is further configured to determine the battery output limit value by:
   determining a maximum battery output setting value based on a battery output map; and
   multiplying the maximum battery output setting value by the derate ratio.

8. The electrified vehicle of claim 7, wherein the battery controller is configured to determine the maximum battery output setting value by accessing, based on a state of charge of the battery and a battery temperature, the battery output map.

9. The electrified vehicle of claim 1, wherein the derate ratio is negatively correlated with an average battery output power.

10. The electrified vehicle of claim 1, wherein the battery controller is further configured to set the derate ratio to 1 based on the output limiting being not performed.

11. The electrified vehicle of claim 1, wherein the battery controller comprises a rate limiter configured to:
change the battery output limit value within a preset change rate limit; and
output the changed battery output limit value to an external device.

12. The electrified vehicle of claim 11, wherein the battery controller is further configured to, based on the output limiting being performed, set a largest value, among a current battery output power, an average battery output power, and the battery output limit value, as an initial value of the changed battery output limit value.

13. The electrified vehicle of claim 11, wherein the battery controller is further configured to, based on the output limiting being not performed, set a maximum battery output setting value as an initial value of the changed battery output limit value.

14. The electrified vehicle of claim 1, further comprising:
a motor controller configured to output a motor output limit value and an inverter output limit value; and
a vehicle controller configured to transmit a torque command, associated with the motor, to the motor controller, wherein the torque command is based on a smallest value among the battery output limit value, the motor output limit value, and the inverter output limit value.

15. An electrified vehicle comprising:
a battery;
a motor drive device configured to drive a motor through an inverter, based on a voltage of the battery; and
a battery controller configured to:
determine whether to perform output limiting on the battery, based on whether a ratio of regenerative braking is less than or equal to a preset ratio, wherein the ratio of regenerative braking is varied according to an amount of charging of the battery and an amount of discharging of the battery within a preset time interval; and
determine, based on the output limiting being performed on the battery and based on a battery output limit map, a battery output limit value.

16. The electrified vehicle of claim 15, wherein the ratio of regenerative braking is varied according to a ratio of the amount of charging of the battery to the amount of discharging of the battery.

17. The electrified vehicle of claim 15, wherein the battery controller is configured to determine whether to perform the output limiting, further based on:
whether an average battery output power is greater than or equal to a preset power, and
whether a battery temperature is greater than or equal to an output limit initiation temperature.

18. The electrified vehicle of claim 15, wherein the battery controller is configured to determine the battery output limit value by determining a maximum output setting value based on the battery output limit map, and
wherein the battery output limit map comprises information regarding maximum battery output setting values corresponding to respective combinations of average battery output powers and battery temperatures.

19. The electrified vehicle of claim 15, wherein the battery controller is configured to, based on the output limiting being not performed, determine the battery output limit value by determining, based on the battery output limit map, a maximum output setting value, and
wherein the battery output limit map comprises information regarding maximum battery output setting values corresponding to respective combinations of state of charge values of the battery and battery temperatures.

20. The electrified vehicle of claim 15, further comprising:
a motor controller configured to output a motor output limit value and an inverter output limit value; and
a vehicle controller configured to transmit a torque command, associated with the motor, to the motor controller, wherein the torque command is based on a smallest value among the battery output limit value, the motor output limit value, and the inverter output limit value.

* * * * *